United States Patent [19]

Vanlautem et al.

[11] 3,984,439

[45] Oct. 5, 1976

[54] PROCESS FOR THE MANUFACTURE OF POLYLACTONES DERIVED FROM POLY-α-HYDROXYACRYLIC ACIDS

[75] Inventors: Noel Vanlautem, Brussels; Julien Mulders, Dworp, both of Belgium

[73] Assignee: Solvay & Cie, Brussels, Belgium

[22] Filed: July 18, 1974

[21] Appl. No.: 489,720

[30] Foreign Application Priority Data

July 20, 1973 Luxemburg............................ 68060

[52] U.S. Cl. ...................... 260/343.6; 260/78.3 UA; 260/539 R; 526/227; 526/229; 526/232; 526/292
[51] Int. Cl.² ........................................ C07D 307/32
[58] Field of Search ................. 260/343.6, 78.3 UA, 260/486 D, 539 R, 80 M

[56] References Cited
UNITED STATES PATENTS

| | | | |
|---|---|---|---|
| 2,338,967 | 1/1944 | Pollack | 260/486 D |
| 3,890,288 | 6/1975 | Vogt et al. | 260/80 M |

FOREIGN PATENTS OR APPLICATIONS

| | | | |
|---|---|---|---|
| 2,061,584 | 7/1972 | Germany | 260/80 |

OTHER PUBLICATIONS

Minsk et al., J.A.C.S. 72, 2650–2654 (1950).
Marvel et al., J.A.C.S. 62, 3495–3498 (1940).

*Primary Examiner*—Jane S. Myers
*Attorney, Agent, or Firm*—Spencer & Kaye

[57] ABSTRACT

Process for the manufacture of polylactones derived from poly-α-hydroxyacrylic acids comprises heating a liquid aqueous solution of α, β-dichloropropionic acid to a temperature above 100°C to convert the α,β-dichloropropionic acid to the corresponding α-chloroacrylic acid and polymerizing the α-chloroacrylic acid in the aqueous solution in the presence of a polymerization catalyst to polymerize, hydrolyze and lactonize the α-chloroacrylic acid.

The products obtained can be used as intermediates for the synthesis of salts of poly-α-hydroxyacrylic acids.

17 Claims, No Drawings

PROCESS FOR THE MANUFACTURE OF POLYLACTONES DERIVED FROM POLY-A-HYDROXYACRYLIC ACIDS

BACKGROUND OF THE INVENTION

The present invention relates to a process for the manufacture of polylactones derived from poly-α-hydroxyacrylic acids.

Processes for the preparation of similar polylactones have already been proposed in the articles by C.S. Marvel and colleagues (J.A.C.S., 1940, 62, page 3495) and L.M. Minsk and colleagues (J.A.C.S., 1950, 72, page 2650). These processes are, however, rather complicated; they require numerous intermediate steps and involve a high consumption of reagents.

SUMMARY OF THE INVENTION

A primary object of the present invention is to manufacture polylactones of poly-α-hydroxyacrylic acids, in a single step, starting from the corresponding α,β-dichloropropionic acid, without consuming other reagents.

The present invention, as embodied and broadly described, provides a process for the manufacture of polylactones derived from poly-α-hydroxyacrylic acids of the formula

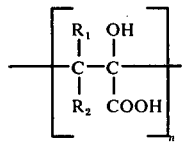

wherein $R_1$ and $R_2$ independently represent a hydrogen atom or an alkyl group containing 1 to 3 carbon atoms and wherein n represents an integer at least equal to 3, comprising heating a liquid aqueous solution containing α,β-dichloropropionic acid of the formula

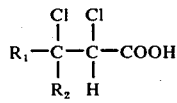

wherein $R_1$ and $R_2$ are defined as above, to a temperature above 100°C to convert the α,β-dichloropropionic acid to the corresponding α-chloroacrylic acid in aqueous solution, and polymerizing the α-chloroacrylic acid in the aqueous solution in the presence of a polymerization catalyst to polymerize, hydrolyze and lactonize the α-chloroacrylic acid.

The polylactones prepared according to the process of the invention, the exact structure of which is not known, are inter and intra-molecular esters of the corresponding poly-α-hydroxyacrylic acids in which 30 to 100%, and in general 40 to 100%, of the acid groups are esterified by alcohol groups.

The alkali metal or ammonium salts of the corresponding poly-α-hydroxyacrylic acids, which salts can be prepared from the polylactones, possess a degree of polymerization such that they are soluble in water at ordinary temperature. Most frequently the degree of polymerization represented by n is such that $50 \leq n \leq 10,000$ and preferably, it is such that $100 \leq n \leq 8,000$.

DETAILED DESCRIPTION OF THE INVENTION

The process of the present invention can be applied very particularly to the manufacture of polylactones of poly-α-hydroxyacrylic acids for which $R_1$ and $R_2$ represent hydrogen or a methyl group, it being possible for $R_1$ and $R_2$ to be identical or different.

The process is especially suited for the manufacture of the polylactone of the unsubstituted poly-α-hydroxyacrylic acid. These polylactones are manufactured from α,β-dichloropropionic acids whichh are chosen as a function of the polylactone which it is desired to prepare.

The process of the invention can be carried out in two stages. In a first stage, the α,β-dichloropropionic acid is converted to the α-chloroacrylic acid which, in a second stage, is polymerized, hydrolyzed and lactonized. However, the most advantageous embodiment of the present invention consists of carrying out all the reactions simultaneously, that is, conversion, polymerization hydrolysis and lactonization are performed simultaneously.

In accordance with the invention, a liquid aqueous solution containing α,β-dichloropropionic acid is heated to a temperature above 100°C to convert the α,β-dichloropropionic acid into the corresponding α-chloroacrylic acid in aqueous solution. The concentration of the α,β-dichloropropionic acid in the aqueous starting solution can vary within very wide limits. Concentrations of between 0.1 and 4 and preferably between 0.7 and 3 mols per liter are preferably used. Lower concentrations can also be used but they render the process of little value economically, because the hourly outputs of the reactor are then low. It is difficult to employ higher concentrations because, during the polymerization, the reaction mixture sets solid.

The temperature to which the solution of the starting α,β-dichloropropionic acid is heated is above 100°C and preferably between 100° and 150°C to bring about the dehydrochlorination of the α,β-dichloropropionic acid into the corresponding α-chloroacrylic acid. In fact, at temperatures below 100°C, the dehydrochlorination of the α, β-dichloropropionic acid to form the corresponding α-chloroacrylic acid proves to be too slow, while at too high temperatures, technological difficulties appear, and especially corrosion of the reactor. The best compromise between the reaction rate and the technological realization of this step of the process is achieved with a temperature range between 100° and 150°C. This temperature is maintained for the entire duration of the conversion of the α,β-dichloropropionic acid.

In accordance with the invention, the α-chloroacrylic acid in the aqueous solution is polymerized in the presence of a polymerization catalyst to polymerize, hydrolyze and lactonize the α-chloroacrylic acid. The polymerization catalyst is added to the liquid reaction medium without it being necessary to remove the hydrogen chloride which is dissolved therein as a result of the dehydrochlorination or the unreacted α,β-dichloropropionic acid.

The polymerization catalyst can be any polymerization catalyst whatsoever with a radical or ionic effect. For example, organic peroxides such as benzoyl peroxide, dibenzoyl peroxide, cumyl hydroperoxide and the like, inorganic peroxide-type compounds such as hydrogen peroxide, sodium perborate, potassium persulphate and the like, and diazo derivatives such as azobisisobutyronitrile may be mentioned. For the choice of these catalysts, reference can be made to the work by D. A. Smith, ADDITION POLYMERS, FORMATION AND CHARACTERIZATION, Butterworth, London, 1968, pages 22–25. Among these catalysts, potassium persulphate is very particularly suitable. The amount of catalyst to be employed is chosen as a function of the amount of $\alpha,\beta$-dichloropropionic acid which is used. The molar ratio of catalyst to $\alpha,\beta$-dichloropropionic acid is between 0.0001 and 0.1 mole of catalyst per mole of $\alpha,\beta$-dichloropropionic acid and preferably between 0.0001 and 0.05 mole of catalyst per mole of $\alpha,\beta$-dichloropropionic acid.

The polymerization catalyst can be introduced into the reaction mixture from the start, that is, before any of the $\alpha,\beta$-dichloropropionic acid is converted to the $\alpha$-chloroacrylic acid, but is more advantageously introduced as soon as the $\alpha$-chloroacrylic acid appears. The catalyst can thus be introduced when at least about 0.01 mol % of the $\alpha,\beta$-dichloropropionic acid has been converted into the corresponding $\alpha$-chloroacrylic acid. There is, however, no disadvantage in introducing the polymerization catalyst after a higher proportion of the starting acid has been converted, for example, after about 50 to 90 mol % of the starting acid has been converted. After the introduction of the polmerization catalyst, the temperature is kept at a value above 40°C, and preferably between 40° and 200°C, so that polymerization takes place at a reasonable rate. Temperatures above 200°C are not suitable, because degradation of the polymer is observed. When the polymerization initiator is introduced at the start of the conversion of the $\alpha,\beta$-dichloropropionic acid, the polymerization temperature is preferably kept between 100° and 150°C, this being a temperature range which is suitable for the dehydrochlorination of the $\alpha,\beta$-dichloropropionic acid to the corresponding $\alpha$-chloroacrylic acid. Quite soon after the introduction of the polymerization catalyst, a solid polymer appears in the reaction mixture, the latter being kept at the appropriate temperature until the end of the reaction.

The pressure in the reactor during conversion of the $\alpha,\beta$-dichloropropionic acid into the corresponding $\alpha$-chloroacrylic acid and during polymerization is such that the reaction medium is liquid at the temperature chosen for the reactions. For obvious reasons of convenience, pressures close to atmospheric pressure will thus be used when the reaction temperature has to be close to or below 100°C, and pressures above atmospheric pressure will thus be used when the reaction temperature has to be above approximately 100°C. Pressures of 0.8 to 5 kg/cm$^2$ will most frequently be used.

The polylactone obtained, which is insoluble in water, is then isolated by any method which is in itself known, and especially by filtration, draining and drying. The resulting solution is a solution of hydrochloric acid which may possibly still contain some $\alpha,\beta$-dichloropropionic acid which has not been dehydrochlorinated. This solution can be used profitably thereafter, especially, where appropriate, by recovering and recycling the $\alpha,\beta$-dichloropropionic acid.

The polylactone prepared according to the present invention is used for manufacturing water-soluble salts of the corresponding poly-$\alpha$-hydroxyacrylic acid, such as alkali metal or ammonium salts, by reaction with the corresponding hydroxides. The alkali metal and ammonium poly-$\alpha$-hydroxyacrylates are used as "builders" in washing powders for domestic use where they advantageously replace the tripolyphosphates which are usually employed but the presence of which in the waste water has a detrimental effect on the environment.

The process of the invention is particularly simple and advantageous. Water, the $\alpha,\beta$-dichloropropionic acid and the catalyst can be introduced into one and the same reactor which is kept at the same temperature for the entire duration of the reaction. Moreover, the polylactone obtained can be isolated very easily from the reaction medium.

The following examples are given by way of illustration to further explain the principles of the present invention. These examples are merely illustrative and are not to be understood as limiting the scope and underlying principles of the invention in any way.

EXAMPLE 1

1,000 ml of water and 200 g of unsubstituted $\alpha,\beta$-dichloropropionic acid are introduced into a 4 liter enamelled autoclave. The mixture is heated and the temperature is kept at 120°–130°C for 3 hours. The pressure prevailing in the autoclave is the autogenic pressure.

After cooling, it is found that the degree of conversion to $\alpha$-chloroacrylic acid is 70% and that the selectivity of the dehydrochlorination reaction is 100%.

A 200 ml sample of the $\alpha$-chloroacrylic acid solution thus obtained is taken and is heated under reflux after adding 0.324 g of potassium persulphate. After heating for 10 minutes, the formation of an insoluble polymer is observed; heating is continued for a further 2 hours and 9.96 g of the water-insoluble lactone of the poly-$\alpha$-hydroxyacrylic acid are collected.

On hydrolyzing this polylactone by means of stoichiometric amounts of 2 N sodium hydroxide solution, sodium poly-$\alpha$-hydroxyacrylate is obtained.

EXAMPLE 2

1 liter of an aqueous solution containing 1 mol of unsubstituted $\alpha,\beta$-dichloropropionic acid is introduced into a 4 liter enamelled autoclave. The mixture is heated under reflux. As soon as chloride ions appear, demonstrating the formation of $\alpha$-chloroacrylic acid, an aqueous solution of potassium persulphate is added at the rate of 0.5 mol of persulphate per 100 mols of $\alpha,\beta$-dichloropropionic acid, and the temperature is kept at 102°–103°C for 8 hours. The pressure prevailing in the autoclave is the autogenic pressure.

After filtering off and drying, 42 g of polylactone are obtained. The selectivity of the reaction is close to 100%.

The product obtained on hydrolyzing this polylactone by means of stoichiometric amounts of sodium hydroxide solution is a sodium poly-$\alpha$-hydroxyacrylate of molecular weight equal to 38,000.

EXAMPLE 3

1 liter of an aqueous solution containing 2 mols of unsubstituted $\alpha,\beta$-dichloropropionic acid is introduced into a 4 liter enamelled autoclave. The temperature is kept at 102°C.

As soon as chloride ions appear, demonstrated by the mercurimetric method, an aqueous solution of potassium persulphate is added at the rate of 0.5 mol of persulphate per 100 mols of $\alpha,\beta$-dichloropropionic acid, and the temperature is maintained for 8 hours. The pressure prevailing in the autoclave is the autogenic pressure. After filtering off and drying, approximately 70 g of polylactone are obtained with a selectivity of 100%.

It will be understood that the above description of the present invention is susceptible to various modifications, changes and adaptations, and the same are intended to be comprehended within the meaning and range of equivalents of the appended claims.

We claim:
1. A process for the manufacture of polylactones derived from poly-α-hydroxyacrylic acids of the formula

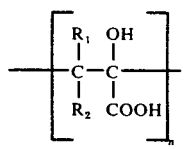

wherein $R_1$ and $R_2$ independently represent a hydrogen atom or an alkyl group containing 1 to 3 carbon atoms and wherein $n$ represents an integer greater than 3, comprising:
a. heating a liquid aqueous solution containing α,β-dichloropropionic acid of the formula

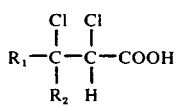

wherein $R_1$ and $R_2$ are defined as above, to a temperature above 100°C to convert the α,β-dichloropropionic acid to the corresponding α-chloroacrylic acid and form a liquid aqueous solution containing α-chloroacrylic acid; and
b. heating said liquid aqueous solution containing α-chloroacrylic acid at a temperature between 40°C and 200°C in the presence of a polymerization catalyst having a radical or ionic effect to polymerize, hydrolyze and lactonize the α-chloroacrylic acid.

2. The process according to claim 1, wherein the concentration of α,β-dichloropropionic acid in the starting aqueous solution is between 0.1 and 4 mols per liter of solution.

3. The process according to claim 2, wherein the concentration of α,β-dichloropropionic acid in the starting liquid aqueous solution of step (a) is between 0.7 and 3 mols per liter of solution.

4. The process according to claim 1 wherein the heating of the liquid aqueous solution containing α,β-dichloropropionic acid is carried out at a temperature of between 100° and 150°C.

5. The process according to claim 1 wherein the polymerization catalyst is added when at least about 0.01 mol % of the α,β-dichloropropionic acid has been converted to the corresponding α-chloroacrylic acid.

6. The process according to claim 1, wherein the polymerization catalyst is a radical polymerization catalyst.

7. The process according to claim 6, wherein the polymerization catalyst is a peroxide-type compound.

8. The process according to claim 7, wherein the polymerization catalyst is potassium persulphate.

9. The process according to claim 1 wherein the amount of catalyst is between 0.0001 and 0.10 mole per mole of α,β-dichloropropionic acid.

10. The process according to claim 1 wherein $R_1$ and $R_2$ represent hydrogen.

11. The process according to claim 1 wherein $R_1$ represents hydrogen and $R_2$ represents the methyl group.

12. The process according to claim 1 wherein the polymerization catalyst is added to the aqueous solution of α,β-dichloropropionic acid before any of the α,β-dichloropropionic acid has been converted to the α-chloroacrylic acid.

13. Process according to claim 12 wherein said heating of said liquid aqueous solution containing α-chloroacrylic acid is carried out at a temperature between 100° and 150°C.

14. The process according to claim 1 wherein the polymerization catalyst is added to the aqueous solution of α,β-dichloropropionic acid as soon as about 0.01 mol % of the α,β-dichloropropionic acid has been converted to the α-chloroacrylic acid.

15. The process according to claim 1 wherein the polymerization catalyst is added to the aqueous solution of α,β-dichloropropionic acid after about 50 to 90 mol % of the α,β-dichloropropionic acid has been converted to the α-chloroacrylic acid.

16. The process according to claim 1 wherein the polymerization catalyst is added to the aqueous solution of α,β-dichloropropionic acid during conversion of the α,β-dichloropropionic acid to the corresponding α-chloroacrylic acid so that conversion, polymerization, hydrolysis and lactonization occur simultaneously.

17. Process according to claim 1 wherein said heating of a liquid aqueous solution containing said α,β-dichloropropionic acid and said heating of said liquid aqueous solution containing α-chloroacrylic acid are carried out simultaneously.

* * * * *